US012311926B2

(12) United States Patent
Anderson

(10) Patent No.: US 12,311,926 B2
(45) Date of Patent: May 27, 2025

(54) WORK MACHINE DISTANCE PREDICTION AND ACTION CONTROL

(71) Applicant: Deere & Company, Moline, IL (US)

(72) Inventor: Noel W. Anderson, Fargo, ND (US)

(73) Assignee: Deere & Company, Moline, IL (US)

( * ) Notice: Subject to any disclaimer, the term of this patent is extended or adjusted under 35 U.S.C. 154(b) by 302 days.

(21) Appl. No.: 17/538,900

(22) Filed: Nov. 30, 2021

(65) Prior Publication Data
US 2023/0166732 A1 Jun. 1, 2023

(51) Int. Cl.
*A01B 79/00* (2006.01)
*B60W 30/095* (2012.01)
(Continued)

(52) U.S. Cl.
CPC ....... *B60W 30/0956* (2013.01); *A01B 79/005* (2013.01); *B60W 50/16* (2013.01);
(Continued)

(58) Field of Classification Search
CPC ............. B60W 30/0956; B60W 50/16; B60W 2050/143; B60W 2300/15; B60W 2420/42; B60W 2554/801; B60W 2554/802; B60W 2720/10; B60W 2720/12; B60W 2720/24; A01B 79/005; G01C 21/3826; G01C 21/3837; G06F 18/2148; G06F 18/24; G06T 7/20; G06T 7/50; G06T 7/60; G06T 7/70; G06T 7/80; G06T 2207/20081; G06T 2207/20084; G06T 2207/30188; G06T 2207/30204; G06T 2207/30241; G06V 10/70; G06V 20/10; G06V 20/56;
(Continued)

(56) References Cited

U.S. PATENT DOCUMENTS

2016/0180531 A1\* 6/2016 Lessmann ............... G06T 7/246
382/103
2019/0313576 A1\* 10/2019 Haneda ................ A01D 34/008
(Continued)

FOREIGN PATENT DOCUMENTS

JP 2020193503 A \* 12/2020

OTHER PUBLICATIONS

JP2020193503A_English Translation (Year: 2020).\*
(Continued)

*Primary Examiner* — Faris S Almatrahi
*Assistant Examiner* — Dana F Artimez
(74) *Attorney, Agent, or Firm* — Fenwick & West LLP

(57) ABSTRACT

A system and a method are disclosed for determining a range of potential distances between a work machine and an object. The system receives an image captured by a camera on the work machine and identifies an object in the image. The system determines an angle between the camera and the object, a height associated with the object, and an uncertainty associated with the height. Based on the angle, the height, and the uncertainty, the system determines a range of potential distances between the work machine and the object. The shortest distance in the range is compared to a threshold distance for safe operation of the work machine. When the shortest distance in the range is less than the threshold distance, the system causes the work machine to perform a safety action.

20 Claims, 7 Drawing Sheets

(51) Int. Cl.
*B60W 50/16* (2020.01)
*G01C 21/00* (2006.01)
*G06F 18/214* (2023.01)
*G06F 18/24* (2023.01)
*G06T 7/20* (2017.01)
*G06T 7/50* (2017.01)
*G06T 7/60* (2017.01)
*G06T 7/70* (2017.01)
*G06T 7/80* (2017.01)
*G06V 10/70* (2022.01)
*G06V 20/10* (2022.01)
*G06V 20/56* (2022.01)
*G06V 20/60* (2022.01)
*B60W 50/14* (2020.01)

(52) U.S. Cl.
CPC ..... *G01C 21/3826* (2020.08); *G01C 21/3837* (2020.08); *G06F 18/2148* (2023.01); *G06F 18/24* (2023.01); *G06T 7/20* (2013.01); *G06T 7/50* (2017.01); *G06T 7/60* (2013.01); *G06T 7/70* (2017.01); *G06T 7/80* (2017.01); *G06V 10/70* (2022.01); *G06V 20/10* (2022.01); *G06V 20/56* (2022.01); *G06V 20/60* (2022.01); *B60W 2050/143* (2013.01); *B60W 2300/15* (2013.01); *B60W 2420/403* (2013.01); *B60W 2554/801* (2020.02); *B60W 2554/802* (2020.02); *B60W 2720/10* (2013.01); *B60W 2720/12* (2013.01); *B60W 2720/24* (2013.01); *G06T 2207/20081* (2013.01); *G06T 2207/20084* (2013.01); *G06T 2207/30188* (2013.01); *G06T 2207/30204* (2013.01); *G06T 2207/30241* (2013.01); *G06V 2201/07* (2022.01)

(58) Field of Classification Search
CPC .. G06V 20/60; G06V 2201/07; G06V 20/188; G01S 2205/01; G01S 3/782; G01S 5/16; G01S 11/12; G01S 17/87; G01S 17/89; G05D 1/0246; G05D 2201/0201
See application file for complete search history.

(56) References Cited

U.S. PATENT DOCUMENTS

| | | | | |
|---|---|---|---|---|
| 2019/0318481 | A1* | 10/2019 | Chen | G06T 7/12 |
| 2019/0329421 | A1* | 10/2019 | Deyle | B25J 5/007 |
| 2020/0298847 | A1* | 9/2020 | Tawari | B60W 30/0953 |
| 2020/0326715 | A1* | 10/2020 | Hurd | G05D 1/0214 |
| 2021/0056338 | A1 | 2/2021 | Padwick et al. | |
| 2021/0221398 | A1 | 7/2021 | Korobkin et al. | |
| 2021/0264624 | A1 | 8/2021 | Fu et al. | |
| 2022/0012911 | A1* | 1/2022 | Townsend | G06T 7/74 |

OTHER PUBLICATIONS

Engineering Toolbox, "Age and Physical Growth—Weight and Height," Engineering Toolbox, 2009, 10 pages, [Online] [Retrieved Apr. 4, 2022], Retrieved from the internet <URL:https://www.engineeringtoolbox.com/age-physical-growth-boys-girls-d_1552.html>.

Huelke, D. F., "An Overview of Anatomical Considerations of Infants and Children in the Adult World of Automobile Safety Design," Annual Proceedings / Association for the Advancement of Automotive Medicine, Oct. 5-7, 1998, pp. 93-113.

Ratini, M., "Average Heights of Men Around the World," MedicineNet.com, Mar. 31, 2022, 5 pages, [Online] [Retrieved Apr. 4, 2022], Retrieved from the internet <URL:https://www.medicinenet.com/height_men/article.htm>.

Robotpark, "Stadimetry—21128," Encyclopedia Robotics, Mar. 28, 2013, 2 pages, [Online] [retrieved Apr. 4, 2022], Retrieved from the internet <URL:https://www.robotpark.com/academy/stadimetry-21128/>.

Extended European Search Report and Written Opinion issued in European Patent Application No. 22201671.9, dated Mar. 24, 2023, in 09 pages.

* cited by examiner

WORK MACHINE DISTANCE PREDICTION AND ACTION CONTROL

TECHNICAL FIELD

The disclosure generally relates to the field of off-road work machines, and more particularly relates to controlling actions of autonomous and semi-autonomous work machines based on predicted distances to objects.

BACKGROUND

Off-road work machines operate in environments surrounded by various obstacles and other objects. For example, objects that a work machine operating on a farm may encounter include humans, plants, fences, farming equipment, storage equipment, and safety cones. Because work machines can damage objects, safe operation of the work machine may include determining the distances to the objects to enable the work machines to maintain safe distances from the objects. Historically, work machines were controlled manually by human operators to stay away from objects, but work machines are increasingly becoming semi-autonomous or autonomous. A semi-autonomous or autonomous work machine can capture an image of its surroundings and predict a distance to an object in the image from known camera features (e.g., camera pose, field of view) and location of the bottom of the object in the image given an assumption that the object lies on a flat surface. However, work machines often operate in terrains that are not flat, and such an approach may result in erroneous distance predictions, which can result in the work machine performing an action that causes damage to the work machine and/or its surrounding objects.

SUMMARY

A work machine management system described herein determines a range of potential distances between a work machine and an object and generates instructions for operating the work machine based on the determined range of potential distances. In an embodiment, the work machine management system receives an image captured by a camera coupled to the work machine. From the image, the work machine management system identifies an object within the image (e.g., person, worksite equipment, safety cone) and retrieves a height associated with the object and an uncertainty associated with the height. The height and the uncertainty may be determined from a distribution of heights for an object type associated with the identified object. The work machine management system determines an angle between the camera and the object and determines a range of potential distances between the work machine and the object based on the height associated with the object, the uncertainty associated with the height, and the angle between the camera and the object. The work machine management system compares a shortest distance in the range of potential distances to a threshold distance. When the shortest distance in the range of potential distances is less than the threshold distance, the work machine management system causes the work machine to perform a safety action (e.g., sound an alarm, generate a haptic alert, change course of work machine). When the shortest distance in the range of potential distance is greater than the threshold distance, the work machine management system allows the work machine to continue operating autonomously or semi-autonomously without performing a safety operation.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

Figure 1A:
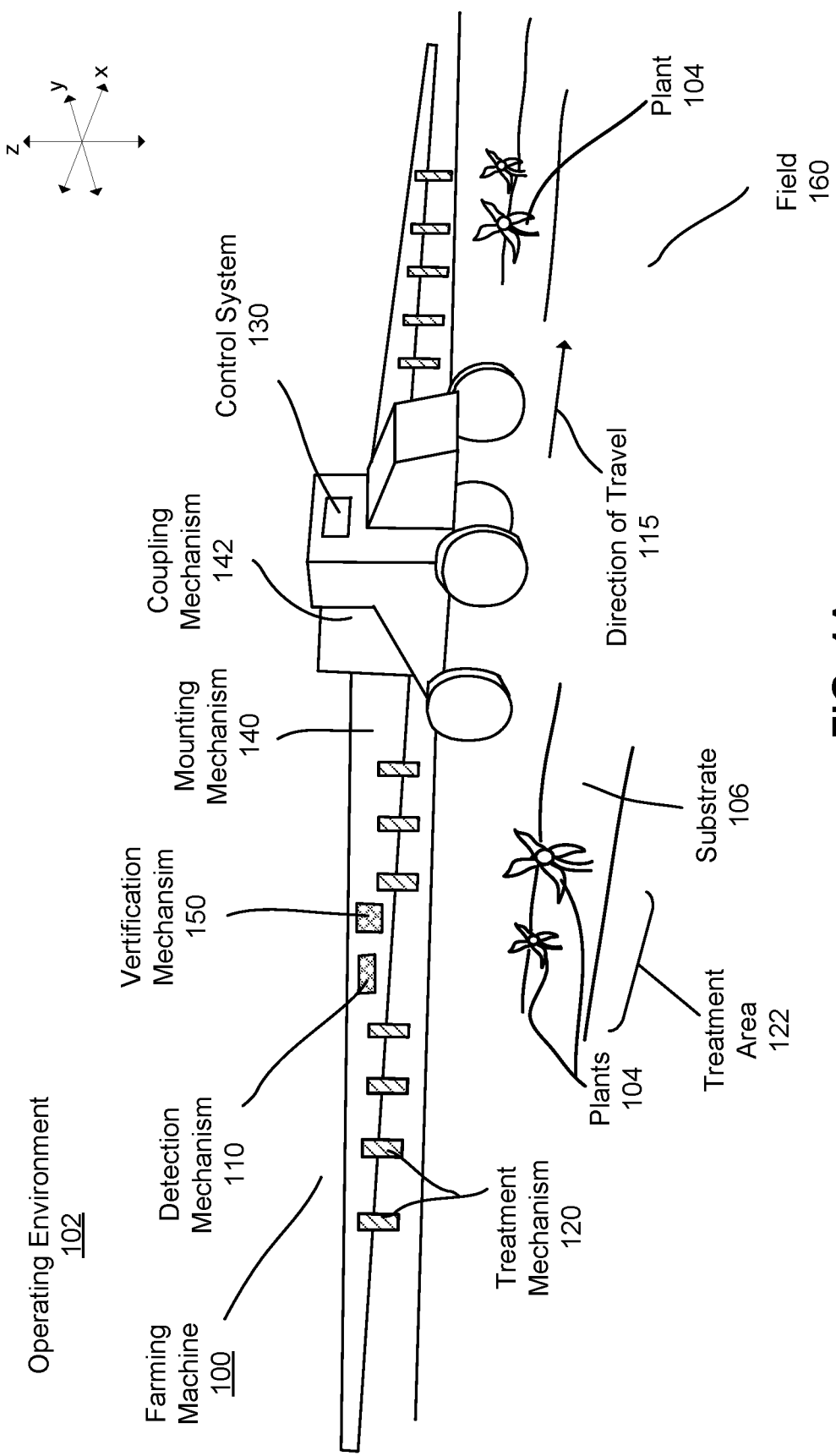
FIG. 1A is an isometric view of a farming machine that performs farming actions of a treatment plan, according an embodiment.

The figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein. For example, FIGS. 1A-1C describe a farming machine that operates in a farming environment. However, the methods and systems described herein are not limited to farming. Without limitation, alternative environments that work machines may operate include construction, forestry, and turf care. Examples of work machines include tractors, planters, sprayers, mowers, balers, harvesters, seeders, tillers, haulers, loaders, dozers, excavators, milling machines, and rollers.

I. Field Management and Treatment Plans

Field Management

Agricultural managers ("managers") are responsible for managing farming operations in one or more fields. Managers work to implement a farming objective within those fields and select from among a variety of farming actions to implement that farming objective. Traditionally, managers are, for example, a farmer or agronomist that works the field but could also be other people and/or systems configured to manage farming operations within the field. For example, a manager could be an automated farming machine, a machine learned computer model, etc. In some cases, a manager may be a combination of the managers described above. For example, a manager may include a farmer assisted by a machine learned agronomy model and one or more automated farming machines or could be a farmer and an agronomist working in tandem.

Managers implement one or more farming objectives for a field. A farming objective is typically a macro-level goal for a field. For example, macro-level farming objectives may include treating crops with growth promotors, neutralizing weeds with growth regulators, harvesting a crop with the best possible crop yield, or any other suitable farming objective. However, farming objectives may also be a micro-level goal for the field. For example, micro-level farming objectives may include treating a particular plant in the field, repairing or correcting a part of a farming machine, requesting feedback from a manager, etc. Of course, there are many possible farming objectives and combinations of farming objectives, and the previously described examples are not intended to be limiting.

Farming objectives are accomplished by one or more farming machines performing a series of farming actions. Farming machines are described in greater detail below. Farming actions are any operation implementable by a farming machine within the field that works towards a farming objective. Consider, for example, a farming objective of harvesting a crop with the best possible yield. This farming objective requires a litany of farming actions, e.g., planting the field, fertilizing the plants 104, watering the plants 104, weeding the field, harvesting the plants 104, evaluating yield, etc. Similarly, each farming action pertaining to harvesting the crop may be a farming objective in and of itself. For instance, planting the field can require its own set of farming actions, e.g., preparing the soil, digging in the soil, planting a seed, etc.

In other words, managers implement a treatment plan in the field to accomplish a farming objective. A treatment plan is a hierarchical set of macro-level and/or micro-level objectives that accomplish the farming objective of the manager. Within a treatment plan, each macro or micro-objective may require a set of farming actions to accomplish, or each macro or micro-objective may be a farming action itself. So, to expand, the treatment plan is a temporally sequenced set of farming actions to apply to the field that the manager expects will accomplish the faming objective.

When executing a treatment plan in a field, the treatment plan itself and/or its constituent farming objectives and farming actions have various results. A result is a representation as to whether, or how well, a farming machine accomplished the treatment plan, farming objective, and/or farming action. A result may be a qualitative measure such as "accomplished" or "not accomplished," or may be a quantitative measure such as "40 pounds harvested," or "1.25 acres treated." Results can also be positive or negative, depending on the configuration of the farming machine or the implementation of the treatment plan. Moreover, results can be measured by sensors of the farming machine, input by managers, or accessed from a datastore or a network.

Traditionally, managers have leveraged their experience, expertise, and technical knowledge when implementing farming actions in a treatment plan. In a first example, a manager may spot check weed pressure in several areas of the field to determine when a field is ready for weeding. In a second example, a manager may refer to previous implementations of a treatment plan to determine the best time to begin planting a field. Finally, in a third example, a manager may rely on established best practices in determining a specific set of farming actions to perform in a treatment plan to accomplish a farming objective.

Leveraging manager and historical knowledge to make decisions for a treatment plan affects both spatial and temporal characteristics of a treatment plan. For instance, farming actions in a treatment plan have historically been applied to entire field rather than small portions of a field. To illustrate, when a manager decides to plant a crop, she plants 104 the entire field instead of just a corner of the field having the best planting conditions; or, when the manager decides to weed a field, she weeds the entire field rather than just a few rows. Similarly, each farming action in the sequence of farming actions of a treatment plan are historically performed at approximately the same time. For example, when a manager decides to fertilize a field, she fertilizes the field at approximately the same time; or, when the manager decides to harvest the field, she does so at approximately the same time.

Notably though, farming machines have greatly advanced in their capabilities. For example, farming machines 100 continue to become more autonomous, include an increasing number of sensors and measurement devices, employ higher amounts of processing power and connectivity, and implement various machine vision algorithms to enable managers to successfully implement a treatment plan.

Because of this increase in capability, managers are no longer limited to spatially and temporally monolithic implementations of farming actions in a treatment plan. Instead, managers may leverage advanced capabilities of farming machines to implement treatment plans that are highly localized and determined by real-time measurements in the field. In other words, rather than a manager applying a "best guess" treatment plan to an entire field, they can implement individualized and informed treatment plans for each plant in the field.

II. Farming Machine Overview

A farming machine that implements farming actions of a treatment plan may have a variety of configurations, some of which are described in greater detail below.

Figure 1B:
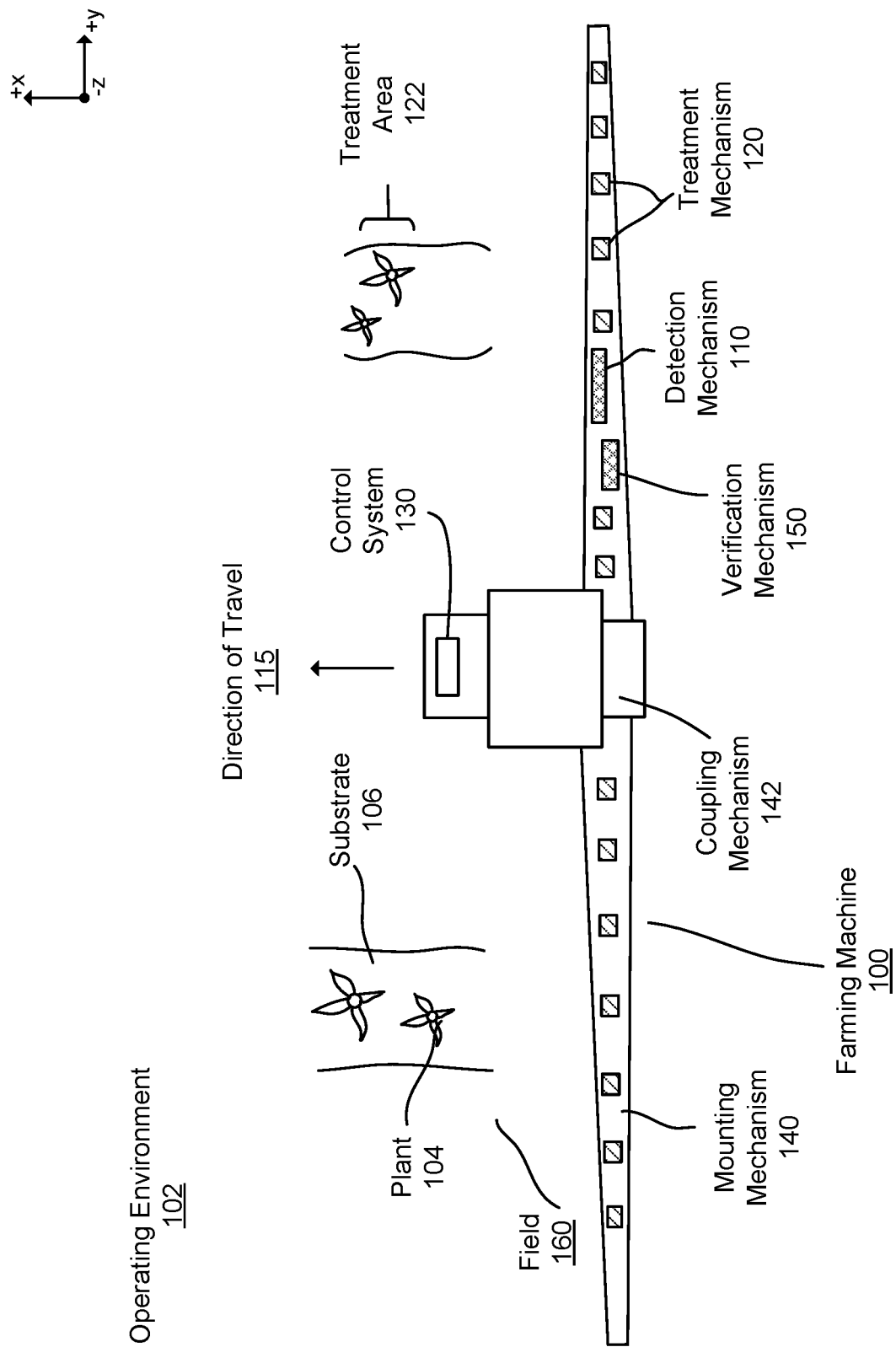
FIG. 1B is a top view of the farming machine in FIG. 1A, according to an embodiment.
Figure 1C:
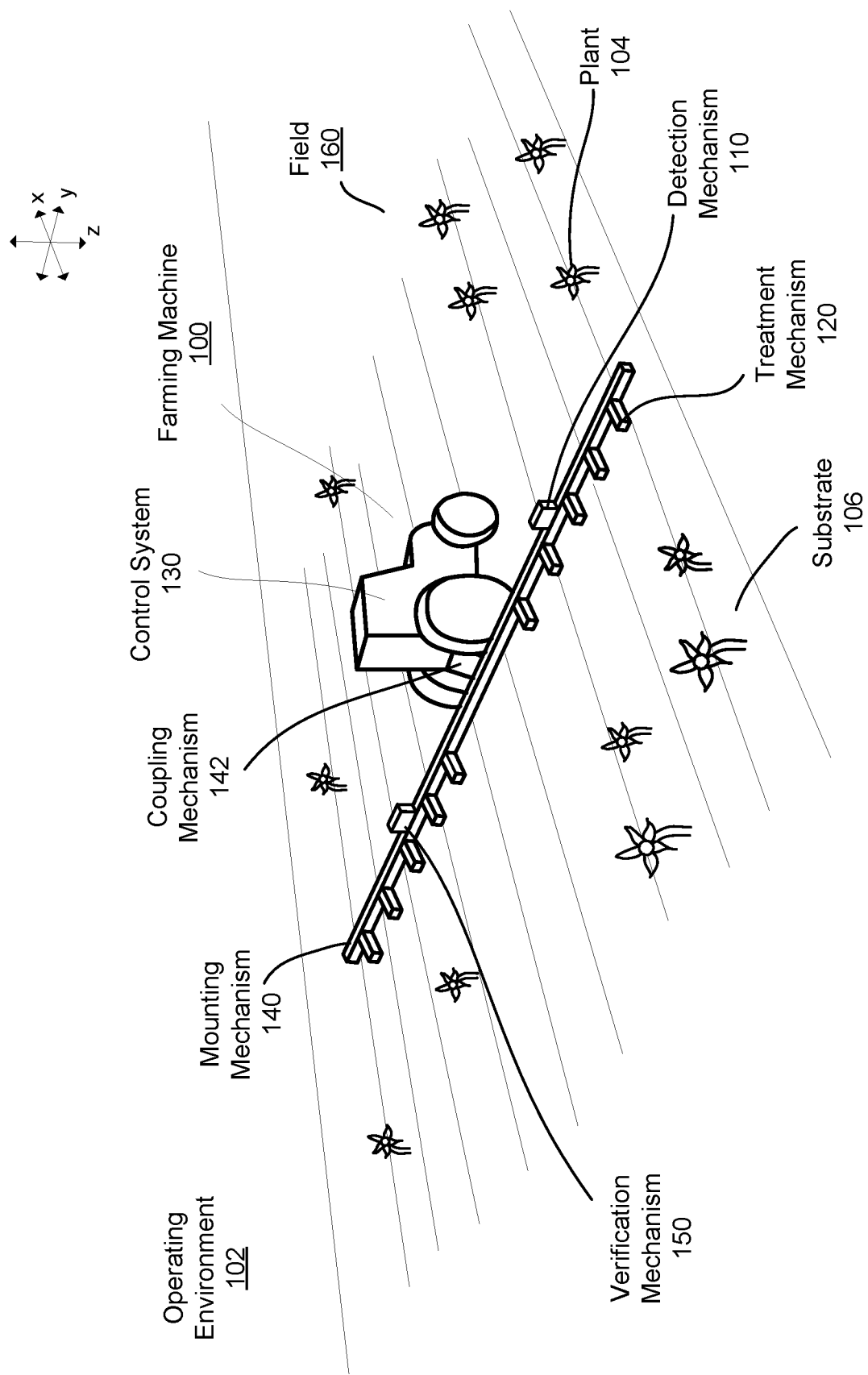
FIG. 1C is an isometric view of another farming machine that performs farming actions of a treatment plan, according to an embodiment.

FIG. 1A is an isometric view of a farming machine 100 that performs farming actions of a treatment plan, according to one example embodiment, and FIG. 1B is a top view of the farming machine 100 in FIG. 1A. FIG. 1C is an isometric view of another farming machine 100 that performs farming actions of a treatment plan, in accordance with one example embodiment.

The farming machine 100 includes a detection mechanism 110, a treatment mechanism 120, and a control system 130. The farming machine 100 can additionally include a mounting mechanism 140, a verification mechanism 150, a power source, digital memory, communication apparatus, or any other suitable component that enables the farming machine 100 to implement farming actions in a treatment plan. Moreover, the described components and functions of the farming machine 100 are just examples, and a farming machine 100 can have different or additional components and functions other than those described below.

The farming machine 100 is configured to perform farming actions in a field 160, and the implemented farming actions are part of a treatment plan. To illustrate, the farming machine 100 implements a farming action which applies a treatment to one or more plants 104 and/or the substrate 106 within a geographic area. Here, the treatment farming actions are included in a treatment plan to regulate plant growth. As such, treatments are typically applied directly to a single plant 104, but can alternatively be directly applied to multiple plants 104, indirectly applied to one or more plants 104, applied to the environment 102 associated with the plant 104 (e.g., soil, atmosphere, or other suitable portion of the plant's environment adjacent to or connected by an environmental factors, such as wind), or otherwise applied to the plants 104.

In a particular example, the farming machine 100 is configured to implement a farming action which applies a treatment that necroses the entire plant 104 (e.g., weeding) or part of the plant 104 (e.g., pruning). In this case, the farming action can include dislodging the plant 104 from the supporting substrate 106, incinerating a portion of the plant 104 (e.g., with directed electromagnetic energy such as a laser), applying a treatment concentration of working fluid (e.g., fertilizer, hormone, water, etc.) to the plant 104, or treating the plant 104 in any other suitable manner.

In another example, the farming machine 100 is configured to implement a farming action which applies a treatment to regulate plant growth. Regulating plant growth can include promoting plant growth, promoting growth of a plant portion, hindering (e.g., retarding) plant 104 or plant portion growth, or otherwise controlling plant growth. Examples of regulating plant growth includes applying growth hormone to the plant 104, applying fertilizer to the plant 104 or substrate 106, applying a disease treatment or insect treatment to the plant 104, electrically stimulating the plant 104, watering the plant 104, pruning the plant 104, or otherwise treating the plant 104. Plant growth can additionally be regulated by pruning, necrosing, or otherwise treating the plants 104 adjacent to the plant 104.

Operating Environment 102

The farming machine 100 operates in an operating environment 102. The operating environment 102 is the environment 102 surrounding the farming machine 100 while it implements farming actions of a treatment plan. The operating environment 102 may also include the farming machine 100 and its corresponding components itself.

The operating environment 102 typically includes a field 160, and the farming machine 100 generally implements farming actions of the treatment plan in the field 160. A field 160 is a geographic area where the farming machine 100 implements a treatment plan. The field 160 may be an outdoor plant field but could also be an indoor location that houses plants such as, e.g., a greenhouse, a laboratory, a grow house, a set of containers, or any other suitable environment 102.

A field 160 may include any number of field portions. A field portion is a subunit of a field 160. For example, a field portion may be a portion of the field 160 small enough to include a single plant 104, large enough to include many plants 104, or some other size. The farming machine 100 can execute different farming actions for different field portions. For example, the farming machine 100 may apply an herbicide for some field portions in the field 160, while applying a pesticide in another field portion. Moreover, a field 160 and a field portion are largely interchangeable in the context of the methods and systems described herein. That is, treatment plans and their corresponding farming actions may be applied to an entire field 160 or a field portion depending on the circumstances at play.

The operating environment 102 may also include plants 104. As such, farming actions the farming machine 100 implements as part of a treatment plan may be applied to plants 104 in the field 160. The plants 104 can be crops but could also be weeds or any other suitable plant 104. Some example crops include cotton, lettuce, soybeans, rice, carrots, tomatoes, corn, broccoli, cabbage, potatoes, wheat, or any other suitable commercial crop. The weeds may be grasses, broadleaf weeds, thistles, or any other suitable determinantal weed.

More generally, plants 104 may include a stem that is arranged superior to (e.g., above) the substrate 106 and a root system joined to the stem that is located inferior to the plane of the substrate 106 (e.g., below ground). The stem may support any branches, leaves, and/or fruits. The plant 104 can have a single stem, leaf, or fruit, multiple stems, leaves, or fruits, or any number of stems, leaves or fruits. The root system may be a tap root system or fibrous root system, and the root system may support the plant 104 position and absorb nutrients and water from the substrate 106. In various examples, the plant 104 may be a vascular plant 104, non-vascular plant 104, ligneous plant 104, herbaceous plant 104, or be any suitable type of plant 104.

Plants 104 in a field 160 may be grown in one or more plant 104 rows (e.g., plant 104 beds). The plant 104 rows are typically parallel to one another but do not have to be. Each plant 104 row is generally spaced between 2 inches and 45 inches apart when measured in a perpendicular direction from an axis representing the plant 104 row. Plant 104 rows can have wider or narrower spacings or could have variable spacing between multiple rows (e.g., a spacing of 12 in. between a first and a second row, a spacing of 16 in. a second and a third row, etc.).

Plants 104 within a field 160 may include the same type of crop (e.g., same genus, same species, etc.). For example, each field portion in a field 160 may include corn crops. However, the plants 104 within each field 160 may also include multiple crops (e.g., a first, a second crop, etc.). For example, some field portions may include lettuce crops while other field portions include pig weeds, or, in another example, some field portions may include beans while other field portions include corn. Additionally, a single field portion may include different types of crop. For example, a single field portion may include a soybean plant 104 and a grass weed.

The operating environment 102 may also include a substrate 106. As such, farming actions the farming machine 100 implements as part of a treatment plan may be applied to the substrate 106. The substrate 106 may be soil but can alternatively be a sponge or any other suitable substrate 106. The substrate 106 may include plants 104 or may not include plants 104 depending on its location in the field 160. For example, a portion of the substrate 106 may include a row of crops, while another portion of the substrate 106 between crop rows includes no plants 104.

II.A Example Machine Configurations

Detection Mechanism(s)

The farming machine 100 may include a detection mechanism 110. The detection mechanism 110 identifies objects in the operating environment 102 of the farming machine 100. To do so, the detection mechanism 110 obtains information describing the environment 102 (e.g., sensor or image data), and processes that information to identify pertinent objects (e.g., plants 104, substrate 106, persons, etc.) in the operating environment 102. Identifying objects in the environment 102 further enables the farming machine 100 to implement farming actions in the field 160. For example, the detection mechanism 110 may capture an image of the field 160 and process the image with a plant 104 identification model to identify plants 104 in the captured image. The farming machine 100 then implements farming actions in the field 160 based on the plants 104 identified in the image.

The farming machine 100 can include any number or type of detection mechanism 110 that may aid in determining and implementing farming actions. In some embodiments, the detection mechanism 110 includes one or more sensors. For example, the detection mechanism 110 can include a multispectral camera, a stereo camera, a CCD camera, a single lens camera, a CMOS camera, hyperspectral imaging system, LIDAR system (light detection and ranging system), a depth sensing system, dynamometer, IR camera, thermal camera, humidity sensor, light sensor, temperature sensor, or any other suitable sensor. Further, the detection mechanism 110 may include an array of sensors (e.g., an array of cameras) configured to capture information about the environment 102 surrounding the farming machine 100. For example, the detection mechanism 110 may include an array of cameras configured to capture an array of pictures representing the environment 102 surrounding the farming machine 100. The detection mechanism 110 may also be a sensor that measures a state of the farming machine 100. For example, the detection mechanism 110 may be a speed sensor, a heat sensor, or some other sensor that can monitor the state of a component of the farming machine 100. Additionally, the detection mechanism 110 may also be a sensor that measures components during implementation of a farming action. For example, the detection mechanism 110 may be a flow rate monitor, a grain harvesting sensor, a mechanical stress sensor etc. Whatever the case, the detection mechanism 110 senses information about the operating environment 102 (including the farming machine 100).

A detection mechanism 110 may be mounted at any point on the mounting mechanism 140. Depending on where the detection mechanism 110 is mounted relative to the treatment mechanism 120, one or the other may pass over a geographic area in the field 160 before the other. For example, the detection mechanism 110 may be positioned on the mounting mechanism 140 such that it traverses over a geographic location before the treatment mechanism 120 as the farming machine 100 moves through the field 160. In another examples, the detection mechanism 110 is positioned to the mounting mechanism 140 such that the two traverse over a geographic location at substantially the same time as the farming machine 100 moves through the filed. Similarly, the detection mechanism 110 may be positioned on the mounting mechanism 140 such that the treatment mechanism 120 traverses over a geographic location before the detection mechanism 110 as the farming machine 100 moves through the field 160. The detection mechanism 110 may be statically mounted to the mounting mechanism 140, or may be removably or dynamically coupled to the mounting mechanism 140. In other examples, the detection mechanism 110 may be mounted to some other surface of the farming machine 100 or may be incorporated into another component of the farming machine 100.

Verification Mechanism(s)

The farming machine 100 may include a verification mechanism 150. Generally, the verification mechanism 150 records a measurement of the operating environment 102 and the farming machine 100 may use the recorded measurement to verify or determine the extent of an implemented farming action (i.e., a result of the farming action).

To illustrate, consider an example where a farming machine 100 implements a farming action based on a measurement of the operating environment 102 by the detection mechanism 110. The verification mechanism 150 records a measurement of the same geographic area measured by the detection mechanism 110 and where farming machine 100 implemented the determined farming action. The farming machine 100 then processes the recorded measurement to determine the result of the farming action. For example, the verification mechanism 150 may record an image of the geographic region surrounding a plant 104 identified by the detection mechanism 110 and treated by a treatment mechanism 120. The farming machine 100 may apply a treatment detection algorithm to the recorded image to determine the result of the treatment applied to the plant 104.

Information recorded by the verification mechanism 150 can also be used to empirically determine operation parameters of the farming machine 100 that will obtain the desired effects of implemented farming actions (e.g., to calibrate the farming machine 100, to modify treatment plans, etc.). For instance, the farming machine 100 may apply a calibration detection algorithm to a measurement recorded by the farming machine 100. In this case, the farming machine 100 determines whether the actual effects of an implemented farming action are the same as its intended effects. If the effects of the implemented farming action are different than its intended effects, the farming machine 100 may perform a calibration process. The calibration process changes operation parameters of the farming machine 100 such that effects of future implemented farming actions are the same as their intended effects. To illustrate, consider the previous example where the farming machine 100 recorded an image of a treated plant 104. There, the farming machine 100 may apply a calibration algorithm to the recorded image to determine whether the treatment is appropriately calibrated (e.g., at its intended location in the operating environment 102). If the farming machine 100 determines that the farming machine 100 is not calibrated (e.g., the applied treatment is at an incorrect location), the farming machine 100 may calibrate itself such that future treatments are in the correct location. Other example calibrations are also possible.

The verification mechanism 150 can have various configurations. For example, the verification mechanism 150 can be substantially similar (e.g., be the same type of mechanism as) the detection mechanism 110 or can be different from the detection mechanism 110. In some cases, the detection mechanism 110 and the verification mechanism 150 may be one in the same (e.g., the same sensor). In an example configuration, the verification mechanism 150 is positioned distal the detection mechanism 110 relative the direction of travel 115, and the treatment mechanism 120 is positioned there between. In this configuration, the verification mechanism 150 traverses over a geographic location in the operating environment 102 after the treatment mechanism 120 and the detection mechanism 110. However, the mounting mechanism 140 can retain the relative positions of the system components in any other suitable configuration. In some configurations, the verification mechanism 150 can be included in other components of the farming machine 100.

The farming machine 100 can include any number or type of verification mechanism 150. In some embodiments, the verification mechanism 150 includes one or more sensors. For example, the verification mechanism 150 can include a multispectral camera, a stereo camera, a CCD camera, a single lens camera, a CMOS camera, hyperspectral imaging system, LIDAR system (light detection and ranging system), a depth sensing system, dynamometer, IR camera, thermal camera, humidity sensor, light sensor, temperature sensor, or any other suitable sensor. Further, the verification mechanism 150 may include an array of sensors (e.g., an array of cameras) configured to capture information about the environment 102 surrounding the farming machine 100. For example, the verification mechanism 150 may include an array of cameras configured to capture an array of pictures representing the operating environment 102.

Treatment Mechanism(s)

The farming machine 100 may include a treatment mechanism 120. The treatment mechanism 120 can implement farming actions in the operating environment 102 of a farming machine 100. For instance, a farming machine 100 may include a treatment mechanism 120 that applies a treatment to a plant 104, a substrate 106, or some other object in the operating environment 102. More generally, the farming machine 100 employs the treatment mechanism 120 to apply a treatment to a treatment area 122, and the treatment area 122 may include anything within the operating environment 102 (e.g., a plant 104 or the substrate 106). In other words, the treatment area 122 may be any portion of the operating environment 102.

When the treatment is a plant treatment, the treatment mechanism 120 applies a treatment to a plant 104 in the field 160. The treatment mechanism 120 may apply treatments to identified plants or non-identified plants. For example, the farming machine 100 may identify and treat a specific plant (e.g., plant 104) in the field 160. Alternatively, or additionally, the farming machine 100 may identify some other trigger that indicates a plant treatment and the treatment mechanism 120 may apply a plant treatment. Some example plant treatment mechanisms 120 include: one or more spray nozzles, one or more electromagnetic energy sources (e.g., a laser), one or more physical implements configured to manipulate plants, but other plant 104 treatment mechanisms 120 are also possible.

Additionally, when the treatment is a plant treatment, the effect of treating a plant 104 with a treatment mechanism 120 may include any of plant necrosis, plant growth stimulation, plant portion necrosis or removal, plant portion growth stimulation, or any other suitable treatment effect. Moreover, the treatment mechanism 120 can apply a treatment that dislodges a plant 104 from the substrate 106, severs a plant 104 or portion of a plant 104 (e.g., cutting), incinerates a plant 104 or portion of a plant 104, electrically stimulates a plant 104 or portion of a plant 104, fertilizes or promotes growth (e.g., with a growth hormone) of a plant 104, waters a plant 104, applies light or some other radiation to a plant 104, and/or injects one or more working fluids into the substrate 106 adjacent to a plant 104 (e.g., within a threshold distance from the plant). Other plant treatments are also possible. When applying a plant treatment, the treatment mechanisms 120 may be configured to spray one or more of: an herbicide, a fungicide, insecticide, some other pesticide, or water.

When the treatment is a substrate treatment, the treatment mechanism 120 applies a treatment to some portion of the substrate 106 in the field 160. The treatment mechanism 120 may apply treatments to identified areas of the substrate 106, or non-identified areas of the substrate 106. For example, the farming machine 100 may identify and treat an area of substrate 106 in the field 160. Alternatively, or additionally, the farming machine 100 may identify some other trigger that indicates a substrate 106 treatment and the treatment mechanism 120 may apply a treatment to the substrate 106. Some example treatment mechanisms 120 configured for applying treatments to the substrate 106 include: one or more spray nozzles, one or more electromagnetic energy sources, one or more physical implements configured to manipulate the substrate 106, but other substrate 106 treatment mechanisms 120 are also possible. Of course, the farming machine 100 is not limited to treatment mechanisms 120 for plants 104 and substrates 106. The farming machine 100 may include treatment mechanisms 120 for applying various other treatments to objects in the field 160. Some other example treatment mechanisms 120 may include sprays, physical manipulation, and EM sources.

Depending on the configuration, the farming machine 100 may include various numbers of treatment mechanisms 120 (e.g., 1, 2, 5, 20, 60, etc.). A treatment mechanism 120 may be fixed (e.g., statically coupled) to the mounting mechanism 140 or attached to the farming machine 100. Alternatively, or additionally, a treatment mechanism 120 may movable (e.g., translatable, rotatable, etc.) on the farming machine 100. In one configuration, the farming machine 100 includes a single treatment mechanism 120. In this case, the treatment mechanism 120 may be actuatable to align the treatment mechanism 120 to a treatment area 122. In a second variation, the farming machine 100 includes a treatment mechanism 120 assembly comprising an array of treatment mechanisms 120. In this configuration, a treatment mechanism 120 may be a single treatment mechanism 120, a combination of treatment mechanisms 120, or the treatment mechanism 120 assembly. Thus, either a single treatment mechanism 120, a combination of treatment mechanisms 120, or the entire assembly may be selected to apply a treatment to a treatment area 122. Similarly, either the single, combination, or entire assembly may be actuated to align with a treatment area, as needed. In some configurations, the farming machine 100 may align a treatment mechanism 120 with an identified object in the operating environment 102. That is, the farming machine 100 may identify an object in the operating environment 102 and actuate the treatment mechanism 120 such that its treatment area aligns with the identified object.

A treatment mechanism 120 may be operable between a standby mode and a treatment mode. In the standby mode the treatment mechanism 120 does not apply a treatment, and in the treatment mode the treatment mechanism 120 is controlled by the control system 130 to apply the treatment. However, the treatment mechanism 120 can be operable in any other suitable number of operation modes.

Control System(s)

The farming machine 100 includes a control system 130. The control system 130 controls operation of the various components and systems on the farming machine 100. For instance, the control system 130 can obtain information about the operating environment 102, processes that information to identify a farming action to implement, and implement the identified farming action with system components of the farming machine 100.

The control system 130 can receive information from the detection mechanism 110, the verification mechanism 150, the treatment mechanism 120, and/or any other component or system of the farming machine 100. For example, the control system 130 may receive measurements from the detection mechanism 110 or verification mechanism 150, or information relating to the state of a treatment mechanism 120 or implemented farming actions from a verification mechanism 150. Other information is also possible.

Similarly, the control system 130 can provide input to the detection mechanism 110, the verification mechanism 150, and/or the treatment mechanism 120. For instance, the control system 130 may be configured input and control operating parameters of the farming machine 100 (e.g., speed, direction). Similarly, the control system 130 may be configured to input and control operating parameters of the detection mechanism 110 and/or verification mechanism 150. Operating parameters of the detection mechanism 110 and/or verification mechanism 150 may include processing time, location and/or angle of the detection mechanism 110, image capture intervals, image capture settings, etc. Other inputs are also possible. Finally, the control system may be configured to generate machine inputs for the treatment mechanism 120. That is translating a farming action of a treatment plan into machine instructions implementable by the treatment mechanism 120.

The control system 130 can be operated by a user operating the farming machine 100, wholly or partially autonomously, operated by a user connected to the farming machine 100 by a network, or any combination of the above. For instance, the control system 130 may be operated by an agricultural manager sitting in a cabin of the farming machine 100, or the control system 130 may be operated by an agricultural manager connected to the control system 130 via a wireless network. In another example, the control system 130 may implement an array of control algorithms, machine vision algorithms, decision algorithms, etc. that allow it to operate autonomously or partially autonomously.

The control system 130 may be implemented by a computer or a system of distributed computers. The computers may be connected in various network environments. For example, the control system 130 may be a series of computers implemented on the farming machine 100 and connected by a local area network. In another example, the control system 130 may be a series of computers implemented on the farming machine 100, in the cloud, a client device and connected by a wireless area network.

The control system 130 can apply one or more computer models to determine and implement farming actions in the field 160. For example, the control system 130 can apply a plant identification module to images acquired by the detection mechanism 110 to determine and implement farming actions. The control system 130 may be coupled to the farming machine 100 such that an operator (e.g., a driver) can interact with the control system 130. In other embodiments, the control system 130 is physically removed from the farming machine 100 and communicates with system components (e.g., detection mechanism 110, treatment mechanism 120, etc.) wirelessly.

In some configurations, the farming machine 100 may additionally include a communication apparatus, which functions to communicate (e.g., send and/or receive) data between the control system 130 and a set of remote devices. The communication apparatus can be a Wi-Fi communication system, a cellular communication system, a short-range communication system (e.g., Bluetooth, NFC, etc.), or any other suitable communication system.

Other Machine Components

In various configurations, the farming machine 100 may include any number of additional components.

For instance, the farming machine 100 may include a mounting mechanism 140. The mounting mechanism 140 provides a mounting point for the components of the farming machine 100. That is, the mounting mechanism 140 may be a chassis or frame to which components of the farming machine 100 may be attached but could alternatively be any other suitable mounting mechanism 140. More generally, the mounting mechanism 140 statically retains and mechanically supports the positions of the detection mechanism 110, the treatment mechanism 120, and the verification mechanism 150. In an example configuration, the mounting mechanism 140 extends outward from a body of the farming machine 100 such that the mounting mechanism 140 is approximately perpendicular to the direction of travel 115. In some configurations, the mounting mechanism 140 may include an array of treatment mechanisms 120 positioned laterally along the mounting mechanism 140. In some configurations, the farming machine 100 may not include a mounting mechanism 140, the mounting mechanism 140 may be alternatively positioned, or the mounting mechanism 140 may be incorporated into any other component of the farming machine 100.

The farming machine 100 may include locomoting mechanisms. The locomoting mechanisms may include any number of wheels, continuous treads, articulating legs, or some other locomoting mechanism(s). For instance, the farming machine 100 may include a first set and a second set of coaxial wheels, or a first set and a second set of continuous treads. In the either example, the rotational axis of the first and second set of wheels/treads are approximately parallel. Further, each set is arranged along opposing sides of the farming machine 100. Typically, the locomoting mechanisms are attached to a drive mechanism that causes the locomoting mechanisms to translate the farming machine 100 through the operating environment 102. For instance, the farming machine 100 may include a drive train for rotating wheels or treads. In different configurations, the farming machine 100 may include any other suitable number or combination of locomoting mechanisms and drive mechanisms.

The farming machine 100 may also include one or more coupling mechanisms 142 (e.g., a hitch). The coupling mechanism 142 functions to removably or statically couple various components of the farming machine 100. For example, a coupling mechanism may attach a drive mechanism to a secondary component such that the secondary component is pulled behind the farming machine 100. In another example, a coupling mechanism may couple one or more treatment mechanisms 120 to the farming machine 100.

The farming machine 100 may additionally include a power source, which functions to power the system components, including the detection mechanism 110, control system 130, and treatment mechanism 120. The power source can be mounted to the mounting mechanism 140, can be removably coupled to the mounting mechanism 140, or can be incorporated into another system component (e.g., located on the drive mechanism). The power source can be a rechargeable power source (e.g., a set of rechargeable batteries), an energy harvesting power source (e.g., a solar system), a fuel consuming power source (e.g., a set of fuel cells or an internal combustion system), or any other suitable power source. In other configurations, the power source can be incorporated into any other component of the farming machine 100.

III. System Environment

Figure 2:
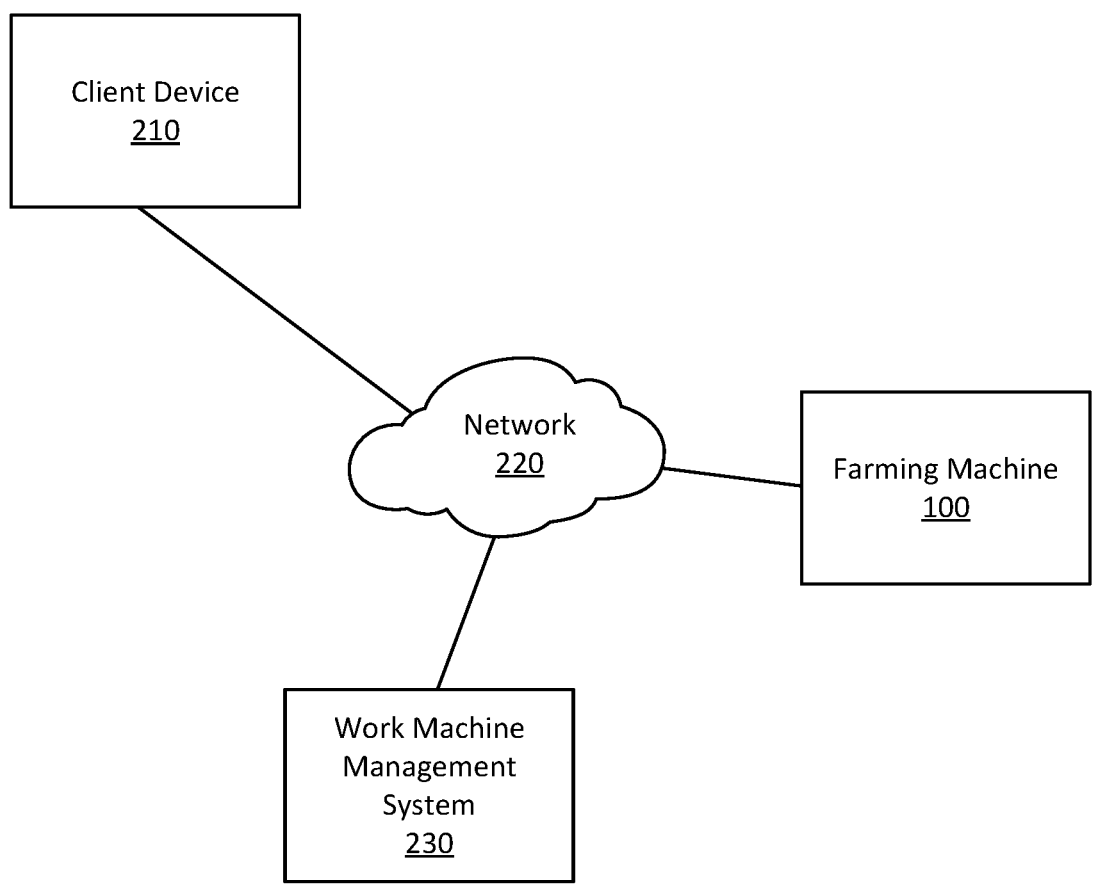
FIG. 2 illustrates a system diagram including a client device, a work machine management system and a work machine, according to an embodiment.

FIG. 2 illustrates a block diagram of a system environment 200 including a client device 210, a work machine management system 230, and a farming machine 100, according to an embodiment. The client device 210, the work machine management system 230, and the farming machine 100 are connected by a network 220. The system environment 200 may have alternative configurations than shown in FIG. 2 and include different, fewer, or additional components. The functionality described herein may use one or more processors. The one or more processors may be local or remote, share information via wired or wireless communications means, and fixedly or dynamically assign portions of computation to processors. The one or more processors can include systems-on-a-chip, embedded processors, servers, desktop computers, tablet computers, or cell phones. The one or more processors may carry out their tasks with varying degrees of human supervision or intervention. Humans may be located at any appropriate processor or communications node of the distributed system. Humans may be physically located on a work machine or at some other location. Example human interaction devices include screens, touch screens, wearable displays, audio or speech output such as ear buds or speakers, microphones, haptic output such as vibration or thermal devices, brain wave sensors, eye trackers, heart rate and other physiological sensors, or cameras for facial, gesture, or other body monitoring.

The client device 210 is a device used by a user to operate the farming machine 100. For example, the user may be an employee associated with the work machine management system 230, a third party individual, or an individual associated with a field where the farming machine 100 is being used (e.g., a farmer that owns the field). The farming machine 100 may be controlled remotely based on inputs from the client device 210 or operate semi-autonomously based on inputs describing the tasks to be performed by the farming machine 100 such as types of tasks, time at which the tasks are to be performed, portions of the field in which the tasks are to be performed, and other information for operating the farming machine 100. In other embodiments, the farming machine 100 may be autonomous and operate without input from the user. The client device 210 is configured to communicate with the farming machine 100 and/or the work machine management system 230 via the network 220, for example using a native application executed by the computing device and provides functionality of the work machine management system 230, or through an application programming interface (API) running on a native operating system of the computing device, such as IOS® or ANDROID™. The client device 210 may be a conventional computer system, such as a desktop or a laptop computer. Alternatively, the client device 210 may be a device having computer functionality, such as a personal digital assistant (PDA), a mobile telephone, a smartphone, or another suitable device. The client device 210 may be integrated with the farming machine 100 (e.g., a console within the farming machine 100). The client device 210 include the hardware and software needed to input and output sound (e.g., speakers and microphone) and images, connect to the network 220 (e.g., via Wifi and/or 4G or other wireless telecommunication standards), determine the current geographic location of the client device 210 (e.g., a Global Positioning System (GPS) unit), and/or detect motion of the client device 210 (e.g., via motion sensors such as accelerometers and gyroscopes).

The client device 210 is configured to communicate via the network 220, which may comprise any combination of local area and/or wide area networks, using both wired and/or wireless communication systems. In one embodiment, the network 220 uses standard communications technologies and/or protocols. For example, the network 220 includes communication links using technologies such as a control area network (CAN), Ethernet, 802.11, worldwide interoperability for microwave access (WiMAX), 3G, 4G, code division multiple access (CDMA), digital subscriber line (DSL), etc. Examples of networking protocols used for communicating via the network 220 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 220 may be represented using any suitable format, such as hypertext markup language (HTML) or extensible markup language (XML). In some embodiments, all or some of the communication links of the network 220 may be encrypted using any suitable technique or techniques. In some embodiments, unauthorized monitoring, altering, or substitution of data communications are mitigated using technologies such as authentication of nodes sending or receiving data with physical unclonable function (PUF), encryption of data exchanged over the network 220, distributed, immutable ledger of data updates (e.g., blockchain), etc.

The farming machine 100 performs tasks in a farming area. The farming machine 100 receives instructions for performing the tasks from the work machine management system 230 and generates control instructions for controlling components of the farming machine 100 to perform the tasks. For the farming machine 100 to operate safely without harming objects in its surrounding environment, the farming machine 100 needs to maintain a safe distance from the objects. The farming machine 100 continuously captures images using a camera coupled to the farming machine 100 and transmits the images to the work machine management system 230 to be analyzed.

The work machine management system 230 analyzes images captured by the camera on the farming machine 100 and predicts distances to one or more objects captured in the images. The predicted distances are used to instruct the farming machine 100 to perform tasks. The tasks may include performing a safety action to avoid colliding into objects. Details on the work machine management system 230 is described below with respect to FIG. 3.

IV. Work Machine Management System

Figure 3:
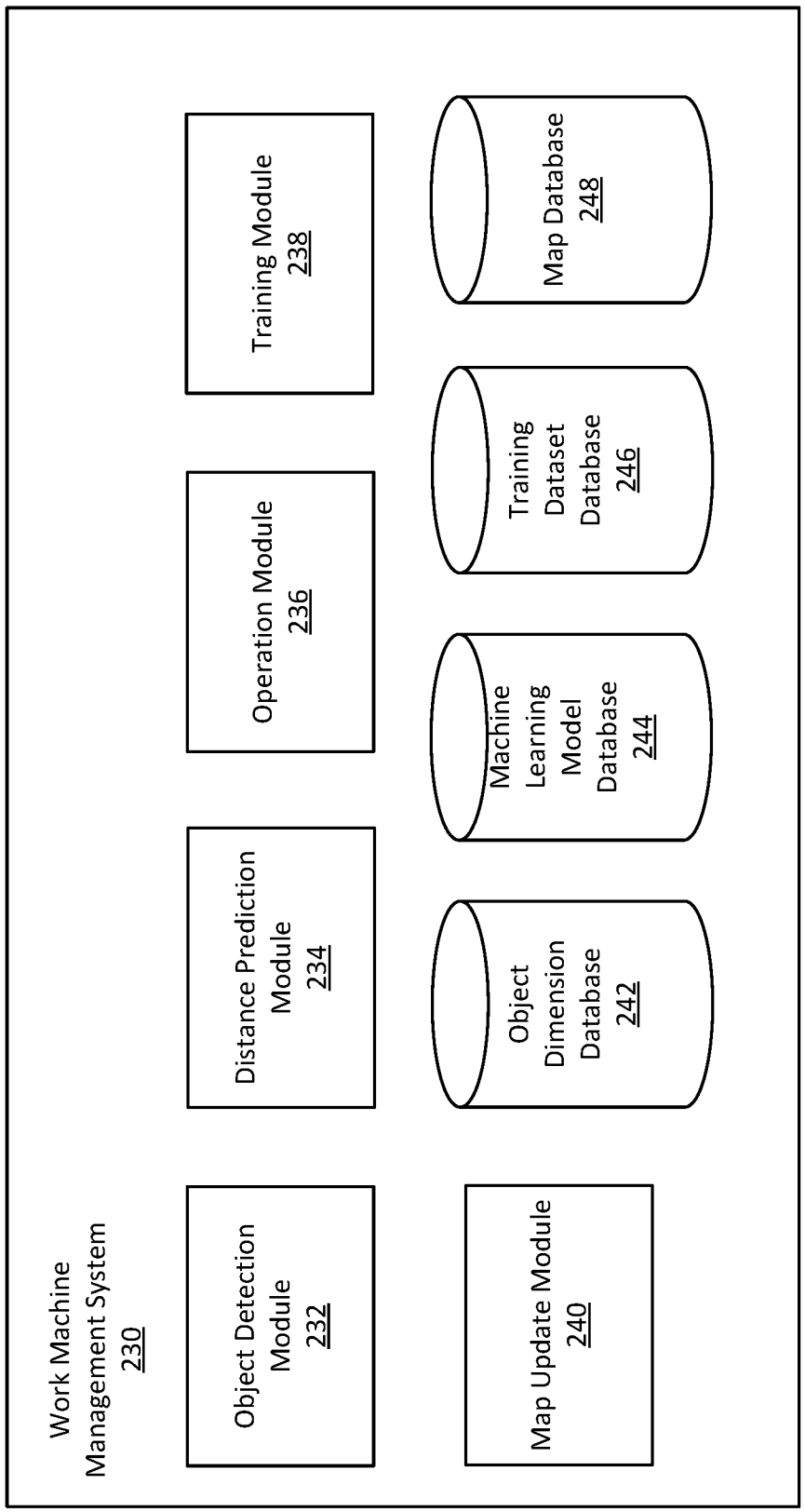
FIG. 3 illustrates a block diagram of modules and databases used by a work machine management system, according to an embodiment.

FIG. 3 illustrates a block diagram of modules and databases used by a work machine management system 230, according to an embodiment. The work machine management system 230 includes an object detection module 232, a distance prediction module 234, an operation module 236, a training module 238, a map update module 240, an object dimension database 242, a machine learning model database 244, a training dataset database 246, and a map database 248. The modules and databases depicted in FIG. 3 are merely exemplary; more or fewer modules and/or databases may be used by the work machine management system 230 in order to achieve the functionalities described herein. Some functionalities of the work machine management system 230 may be performed by the farming machine 100.

The object detection module 232 processes images captured by a camera coupled to the farming machine 100 and identifies objects captured in the images. The object detection module 232 detects instances of objects and object types associated with the objects. In some embodiments, the object detection module 232 may also modify the images (e.g., resizing, debayering, cropping, value normalization, and adjusting image qualities such as contrast, brightness, exposure, temperature) to improve object detection. The object detection module 232 receives the images from the farming machine 100 and provides the images as input to a classifier, such as a machine learning model from the machine learning model database 244 that performs object detection and outputs bounding boxes around the detected objects and associated object types. In some embodiments, the machine learning model is a supervised model that is trained by the training module 238 to output the bounding boxes and the object type labels. The machine learning model may be a neural network, decision tree, or other type of computer model, and any combination thereof. The training dataset for the machine learning model may be stored in the training dataset database 246 and may include historical images of historical objects, each historical image labeled to include a bounding box around at least one object and the corresponding object type. The machine learning model is trained to detect various types of objects that can typically be found in environments in which the farming machine 100 operates.

After detecting the objects, the object detection module 232 retrieves object dimension data associated with the object from the object dimension database 242. The object dimension data may include one or more of height, length, width, or other linear cross section for the object. In some embodiments, the object dimension data includes a particular value for a dimension. For example, an average 55 gallon drum is 35 inches in height and 23 inches in diameter. Therefore, when the object is a 55 gallon drum, the object detection module 232 may predict the distance between the farming machine 100 and the object based on camera parameters and the knowledge that the drum has a height of 35 inches or width of 23 inches. In another example, the object may be a person with a known identity. The object detection module 232 may identify the person using an employee identification tag including a barcode, a radio frequency identification (RFID) circuit, a pattern incorporated into clothing or other worn artifact such as a badge, a unique human physical attributes such as facial features or a tattoo. The object detection module 232 may retrieve the person's known height (e.g., 5 ft. 4 in). When a dimension of an object has a known value, the dimension is associated with low or no uncertainty.

In some embodiments, the object dimension database 242 does not include an exact value for the object but instead includes a distribution of potential values for a dimension having a central tendency (e.g., average, weighted mean, median, mode) and uncertainty (e.g., standard deviation, range, 10%-90% range) for an object type associated with the object. For example, the object detection module 232 may detect that there is a person in the image but may be unable to determine the person's identity or the person's height may not be available in the object dimension database 242. The object detection module 232 may extract geographic characteristics (e.g., country in which the farming machine is operating) and/or observable biographic characteristics (e.g., female, male, age) and use a distribution of heights for people having one or more of the extracted characteristics for the distance prediction. When the object detection module 232 is predicting an age of a person, the object detection module 232 may determine a ratio between different portions of the person's body (e.g., ratio between the person's head and body). Because the ratio between portions of the person's body changes with age, the ratio can be used to infer the person's age. Then, based on the inferred age, the object detection module 232 may retrieve a distribution of heights for people in the age group from the object dimension data base 242. In some embodiments, a person may not be standing up straight in the image, and the object detection module 232 may extrapolate the person's height from visible portions in the image and a pose that the person is in (e.g., squatting).

The distance prediction module 234 predicts a distance between an object identified by the object detection module 232 and the farming machine 100 based on a dimension of the object and an angle between the camera that captured the image and the object. The distance prediction module 234 selects an object of interest among the identified objects to be used to determine a distance from the farming machine 100. In some embodiments, the distance prediction module 234 selects the object based on the object's importance. For example, the object detection module 232 may identify a person working on the field, a storage barrel, and a traffic cone from an image captured by the farming machine 100. The person is more important than the storage barrel, and the storage barrel is more important than the traffic cone. Therefore, the distance prediction module 234 selects the person and predicts the distance between the person and the farming machine 100. In some embodiments, the distance prediction module 234 selects the object of interest based on whether the corresponding object type has standard or uniform dimensions. For example, the American flag can be flown from a flagpole, printed on a t-shirt, printed on a sticker attached to a vehicle, or made into a lapel pin. There are many variations in the dimensions of the flag, which makes it difficult to accurately predict distance from the dimensions. In comparison, farmers commonly use 55 gallon drums, and 55 gallon drums have relatively uniform size. Therefore, when the identified objects in the image include a 55 gallon drum and a flag, the distance prediction module 234 may select the 55 gallon drum over the flag.

Figure 4:
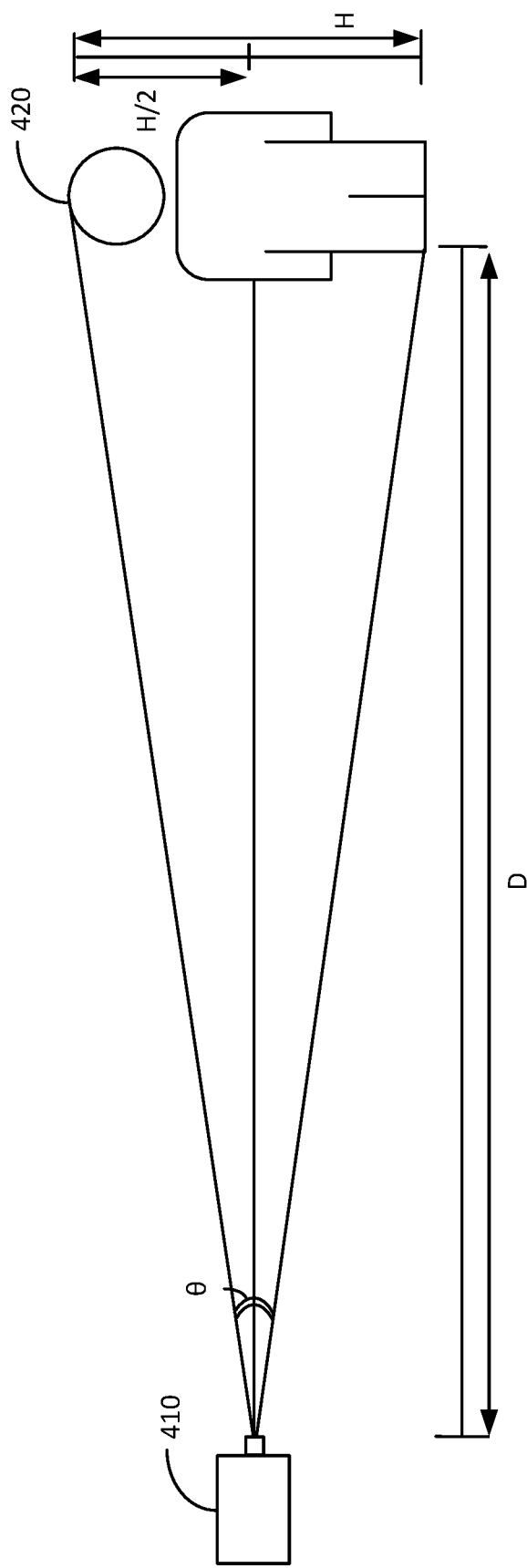
FIG. 4 illustrates an example distance between a work machine and an object, according to an embodiment.

Details for determining the distance between an object and the farming machine 100 are described with respect to FIG. 4. FIG. 4 illustrates an example distance between a farming machine and an object, according to an embodiment. A camera 410 coupled to the farming machine 100 captures an image of a person 420 that has a height H, and the distance prediction module 234 predicts a distance D between the farming machine 100 and the person 420 using the height H of the person and an angle $\theta$. The angle $\theta$ is measured between the camera 410, a point at the top of the person's head, and a point at the bottom of the person's feet. The angle $\theta$ may be determined based on pixels representative of the person 420 in the image and camera features. The camera 410 may have a known vertical angle field of view, and the angle $\theta$ may be determined based on a ratio between height of an image frame and height of pixels representative of the person 420 in the image. In the illustrated example, the distance D between the farming machine 100 and the person 420 is based on the height H of the person, but a different dimension (e.g., width) may be used instead.

When the height H and the angle $\theta$ are known, the distance D can be calculated using Equation 1 below:

$$D = \frac{H/2}{\tan(\theta/2)} \quad \text{(Equation 1)}$$

When the exact height H of the person is known, the distance D has a single possible value. However, when the exact height H of the person is unknown, a distribution of heights of people similar to the person 420 may be used to predict a range of potential distances D. In one embodiment, the distance prediction module 234 determines the range of potential distances D based on the $5^{th}$ percentile height and the $95^{th}$ percentile height in the distribution. For example, the person 420 belongs to a group of users that has a $5^{th}$ percentile height of 1.2 meters and a $95^{th}$ percentile height of 2 meters. When the angle $\theta$ is 20 degrees, the range of potential distances D is between 3.4 meters and 5.7 meters. In other embodiments, the distance prediction module 234 may determine the range of potential distances D from a different range of heights (e.g., heights corresponding to 2 standard deviations below and above the mean).

Referring back to FIG. 3, the operation module 236 determines operation controls for the farming machine 100 based on the distance or range of potential distances predicted by the distance prediction module 234. The operation module 236 determines whether the farming machine 100 is maintaining a safe distance from surrounding objects by comparing the predicted distance to a threshold distance. When there is a range of potential distances available instead of a single value, the operation module 236 may select a shortest distance in the range and compare the shortest distance to the threshold distance. In some embodiments, the threshold distance is a fixed value. In other embodiments, the threshold distance varies based on one or more factors such as direction and speed of farming machine 100, direction and speed of object, type of object, type of farming machine, dimensions of the farming machine, user preferences, and safety guidelines. For example, when the object is a person, the threshold distance may be greater than when the object farming machine 100 is a traffic cone.

When the operation module 236 determines that the predicted distance is less than the threshold distance, the operation module 236 causes the farming machine 100 to perform a safety action. The safety action may include one or more of generating an audio alert, generating a haptic alert, adjusting a speed of the farming machine, stopping the work machine, and adjusting a direction of the farming machine. When the predicted distance is greater than or equal to the threshold distance, the operation module 236 allows the farming machine 100 to continue operating without performing a safety action.

In some embodiments, the work machine management system 230 uses the predicted distances to generate labeled training dataset stored in the training dataset database 246 for training another machine learning model from the machine learning model database 244. Each training sample in the training dataset may include a historical image of an object, an object type associated with the object, camera features of the camera that captured the historical image, and predicted distance to the object. The other machine learning model may be trained by the training module 236 to receive images captured by a camera and features associated with the camera as input and directly output distance predictions for one or more objects captured in the images. That is, when the farming machine 100 is in operation, the other machine learning model may be deployed for the distance predictions instead of applying the machine learning model described with respect to the object detection module 232 that receives images and outputs bounding boxes and object types associated with the detected objects and then predicting the distance to the detected objects based on the camera features.

The map update module 240 updates a map of the environment in which the farming machine 100 is operating to include information on objects detected in the images. In some embodiments, the map database 248 is stored on the work machine management system 230 to be used by a plurality of farming machines 100 connected to the work machine management system 230. In other embodiments, the farming machine 100 stores a map of its surrounding environment locally. The farming machine 100 has a location sensor (e.g., global positioning system sensor) that determines the location of the farming machine 100. As the farming machine 100 moves, the location sensor collects location data and transmits the location data to the work machine management system 230 along with the images. After the range of potential distances between the farming machine 100 and an object has been determined, the map update module 240 may determine potential locations of the object relative to the location of the farming machine 100 and update the map of the environment to include the potential locations of the object. In one example, the potential location may be represented as a circle centered on the most likely location based on the average object height with the circle diameter being the potential range difference calculated from standard deviation, percentiles, etc. The map of the environment may also be updated to include the object type or object identification in association with the object.

V. Predicting Distance to an Object

Figure 5:
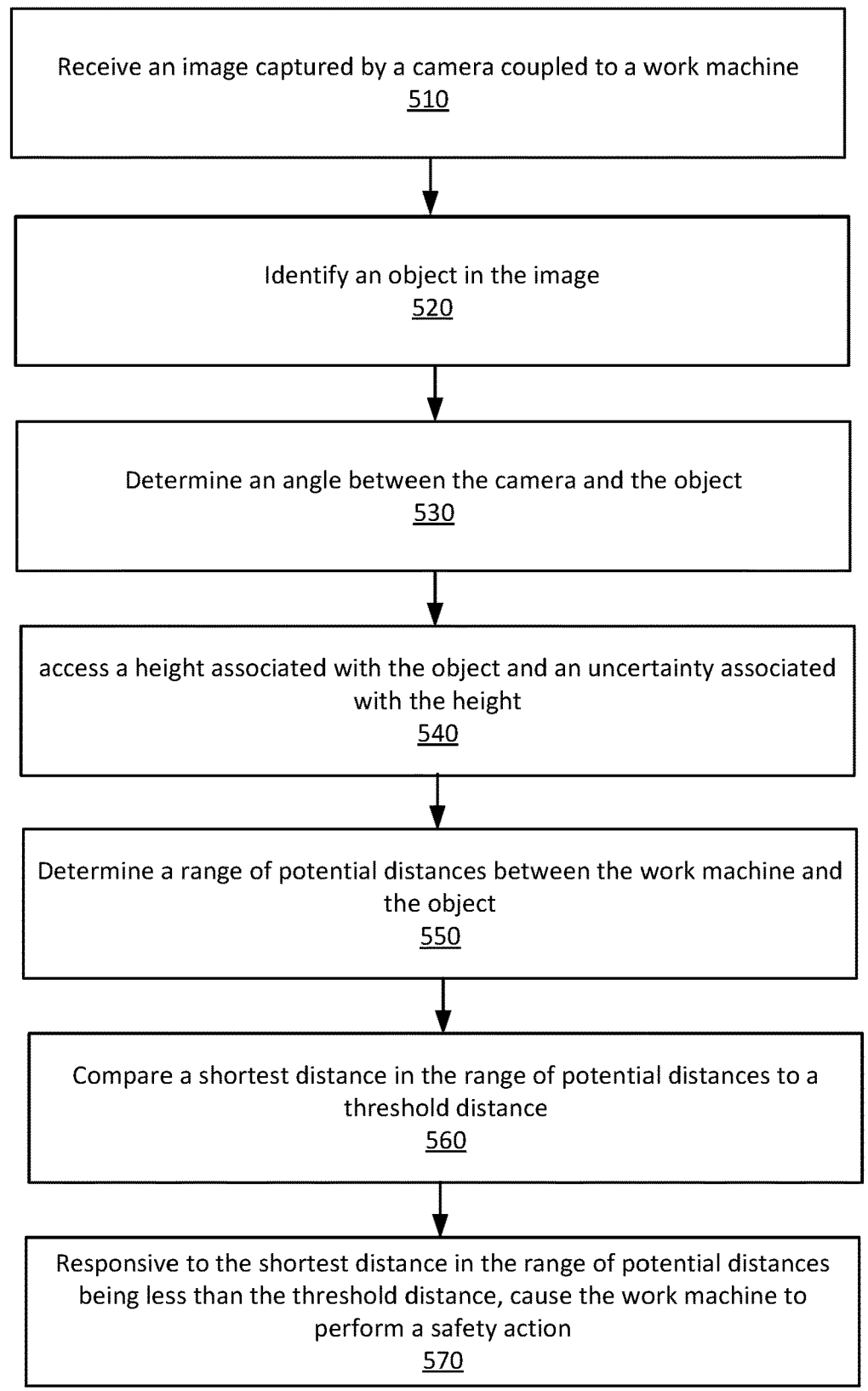
FIG. 5 illustrates a flowchart of a method for determining a range of potential distances between a work machine and an object, according to an embodiment.

FIG. 5 illustrates a flowchart of a method for determining a range of potential distances between a work machine and an object, according to an embodiment. In a process 500, a system receives 510 an image captured by a camera coupled to a work machine. The system identifies 520 an object in the image. The system may identify the object using a machine learning model trained to perform object detection. The system determines 530 an angle between the camera and the object. The angle is measured between the camera, a point at the top of the object, and a point at the bottom of the object. The angle may be determined based on pixels representative of the object in the image and camera features (e.g., angle of field of view). The system accesses 540 a height associated with the object and an uncertainty associated with the height. The height and the uncertainty may be from a distribution of heights of objects similar to the object. The system determines 550 a range of potential distances between the work machine and the object based on the height, the uncertainty, and the angle. The system compares 560 a shortest distance in the range of potential distances to a threshold distance. Responsive to the shortest distance in the range of potential distances being less than the threshold distance, the system causes 570 the work machine to perform a safety action.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA)

or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Upon reading this disclosure, those of skill in the art will appreciate still additional alternative structural and functional designs for a system and a process for tractor control through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method comprising:
receiving an image captured by a camera of a work machine moving within an environment;
accessing a ranking of a plurality of object types, the ranking including: (i) an importance metric which ranks objects based on object type; and (ii) a dimensionality metric which ranks objects having standardized dimensions higher than objects having non-standardized dimensions;
identifying one or more objects in the image;
selecting an object of interest from among the one or more identified objects based on the ranking including the importance metric and the dimensionality metric associated with the one or more identified objects;
determining an angle between the camera and the object of interest;
accessing a height associated with the object of interest and an uncertainty associated with the height;
determining a range of potential distances between the work machine and the object of interest based on the height associated with the object of interest, the uncertainty associated with the height, and the angle between the camera and the object of interest;
comparing a shortest distance in the range of potential distances to a threshold distance, wherein the threshold distance is determined based on an object type associated with the object of interest; and
responsive to the shortest distance in the range of potential distances being less than the threshold distance, causing the work machine to perform a safety action.

2. The method of claim 1, wherein the angle between the camera and the object of interest is determined based on pixels representative of the object of interest in the image and features of the camera.

3. The method of claim 1, wherein the height associated with the object of interest and the uncertainty associated with the height is determined based on geographical characteristics of the environment or observable biographic characteristics of the object of interest.

4. The method of claim 1, wherein the height associated with the object of interest and the uncertainty associated with the height is determined based on an identifying tag on the object of interest.

5. The method of claim 1, further comprising:
determining the threshold distance further based on one or more of: a speed of the work machine, a direction the work machine is moving, a work machine type associated with the work machine, and dimensions of the work machine.

6. The method of claim 1, wherein performing the safety action includes one or more of: generating an audio alert, generating a haptic alert, adjusting a speed of the work machine, stopping the work machine, and adjusting a direction of the work machine.

7. The method of claim 1, further comprising:
receiving a location of the work machine at a time at which the image was captured;
determining potential locations of the object of interest based on the range of potential distances between the work machine and the object of interest; and
updating a map of the environment to include the potential locations of the object of interest.

8. The method of claim 7, wherein the map of the environment is further updated to include the object type associated with the object of interest.

9. The method of claim 1, further comprising:
responsive to determining the range of potential distances between the work machine and the object of interest, updating a training dataset for a machine learning model to include the range of potential distances, the image, and camera features.

10. The method of claim 9, further comprising:
training the machine learning model using the training dataset, the machine learning model configured to receive as input a new image including a given object of interest and information associated with camera features corresponding to a camera that captured the new image and to output a predicted distance to the given object of interest.

11. A non-transitory computer-readable storage medium containing computer program code that, when executed by a processor, causes the processor to perform steps comprising:
receiving an image captured by a camera of a work machine moving within an environment;
accessing a ranking of a plurality of object types, the ranking including: (i) an importance metric which ranks objects based on object type; and (ii) a dimensionality metric which ranks objects having standardized dimensions higher than objects having non-standardized dimensions;
identifying one or more objects in the image;
selecting an object of interest from among the one or more identified objects based on the ranking including the importance metric and the dimensionality metric associated with the one or more identified objects;
determining an angle between the camera and the object of interest;
accessing a height associated with the object of interest and an uncertainty associated with the height;
determining a range of potential distances between the work machine and the object of interest based on the height associated with the object of interest, the uncertainty associated with the height, and the angle between the camera and the object of interest;
comparing a shortest distance in the range of potential distances to a threshold distance, wherein the threshold distance is determined based on an object type associated with the object of interest; and
responsive to the shortest distance in the range of potential distances being less than the threshold distance, causing the work machine to perform a safety action.

12. The non-transitory computer-readable storage medium of claim 11, wherein the angle between the camera and the object of interest is determined based on pixels representative of the object of interest in the image and features of the camera.

13. The non-transitory computer-readable storage medium of claim 11, wherein the height associated with the object of interest and the uncertainty associated with the height is determined based on geographical characteristics of the environment or observable biographic characteristics of the object of interest.

14. The non-transitory computer-readable storage medium of claim 11, wherein the height associated with the object of interest and the uncertainty associated with the height is determined based on an identifying tag on the object of interest.

15. The non-transitory computer-readable storage medium of claim 11, further containing computer program code that, when executed by the processor, causes the processor to perform steps comprising:
determining the threshold distance further based on one or more of: a speed of the work machine, a direction the work machine is moving, a work machine type associated with the work machine, and dimensions of the work machine.

16. The non-transitory computer-readable storage medium of claim 11, wherein performing the safety action includes one or more of: generating an audio alert, generating a haptic alert, adjusting a speed of the work machine, stopping the work machine, and adjusting a direction of the work machine.

17. The non-transitory computer-readable storage medium of claim 11, further containing computer program code that, when executed by the processor, causes the processor to perform steps comprising:
receiving a location of the work machine at a time at which the image was captured;
determining potential locations of the object of interest based on the range of potential distances between the work machine and the object of interest; and
updating a map of the environment to include the potential locations of the object of interest.

18. The non-transitory computer-readable storage medium of claim 11, further containing computer program code that, when executed by the processor, causes the processor to perform steps comprising:
responsive to determining the range of potential distances between the work machine and the object of interest, updating a training dataset for a machine learning model to include the range of potential distances, the image, and camera features.

19. The non-transitory computer-readable storage medium of claim 18, further containing computer program code that, when executed by the processor, causes the processor to perform steps comprising:
training the machine learning model using the training dataset, the machine learning model configured to receive as input a new image including a given object of interest and information associated with camera features corresponding to a camera that captured the new image and to output a predicted distance to the given object of interest.

20. A system comprising:
one or more processors; and
a non-transitory computer-readable medium comprising computer program instructions that, when executed by the one or more processors, cause the one or more processors to perform operations comprising:
receiving an image captured by a camera of a work machine moving within an environment;
accessing a ranking of a plurality of object types, the ranking including: (i) an importance metric which ranks objects based on object type; and (ii) a dimensionality metric which ranks objects having standardized dimensions higher than objects having non-standardized dimensions;
identifying one or more objects in the image;
selecting an object of interest from among the one or more identified objects based on the ranking including the importance metric and the dimensionality metric associated with the one or more identified objects;
determining an angle between the camera and the object of interest;
accessing a height associated with the object of interest and an uncertainty associated with the height;
determining a range of potential distances between the work machine and the object of interest based on the height associated with the object of interest, the uncertainty associated with the height, and the angle between the camera and the object of interest;
comparing a shortest distance in the range of potential distances to a threshold distance, wherein the threshold distance is determined based on an object type associated with the object of interest; and responsive to the shortest distance in the range of potential distances being less than the threshold distance, causing the work machine to perform a safety action.

* * * * *